United States Patent [19]
Ito et al.

[11] Patent Number: 5,177,328
[45] Date of Patent: Jan. 5, 1993

[54] INFORMATION PROCESSING APPARATUS

[75] Inventors: Takafumi Ito; Kensuke Adachi, both of Tokyo, Japan

[73] Assignee: Kabushiki Kaisha Toshiba, Kawasaki, Japan

[21] Appl. No.: 720,158

[22] Filed: Jun. 27, 1991

[30] Foreign Application Priority Data

Jun. 28, 1990 [JP] Japan .................................. 2-168407

[51] Int. Cl.⁵ .............................................. G08C 21/00
[52] U.S. Cl. ....................................... 178/18; 178/19; 340/711
[58] Field of Search ..................... 178/18, 19; 340/711, 340/712

[56] References Cited

U.S. PATENT DOCUMENTS 4,730,186  3/1988  Koga et al. ........................ 178/18 X

FOREIGN PATENT DOCUMENTS 0322675   5/1989  European Pat. Off. .
3714558   5/1987  Fed. Rep. of Germany .
3409532   6/1989  Fed. Rep. of Germany .
63-234315 3/1982  Japan .

OTHER PUBLICATIONS

IBM Technical Disclosure Bulletin vol. 32, No. 8A Jan. 1990, pp. 370-372 Menu Display Method For Integrated Input/Display Device.
IBM Technical Disclosure Bulletin, vol. 25, No. 11B, Apr. 1983, pp. 5905-5906.

Primary Examiner—Stafford D. Schreyer
Attorney, Agent, or Firm—Finnegan, Henderson, Farabow, Garrett and Dunner

[57] ABSTRACT

A display/input device is constituted by superposing a display device and a transparent tablet on each other. An operator points an icon included in an image displayed on a screen of the display device by means of a stylus pen, thereby inputting data. A central part of a coordinate detection area of the tablet overlaps the screen of the display device, and a peripheral part of the coordinate detection area is situated outside the screen. When the stylus pen points a predetermined region within the peripheral part of the coordinate detection area, predetermined processing ("cancel", "previous page", "next page") corresponding to a command allocated to the pointed predetermined region is carried out.

11 Claims, 10 Drawing Sheets

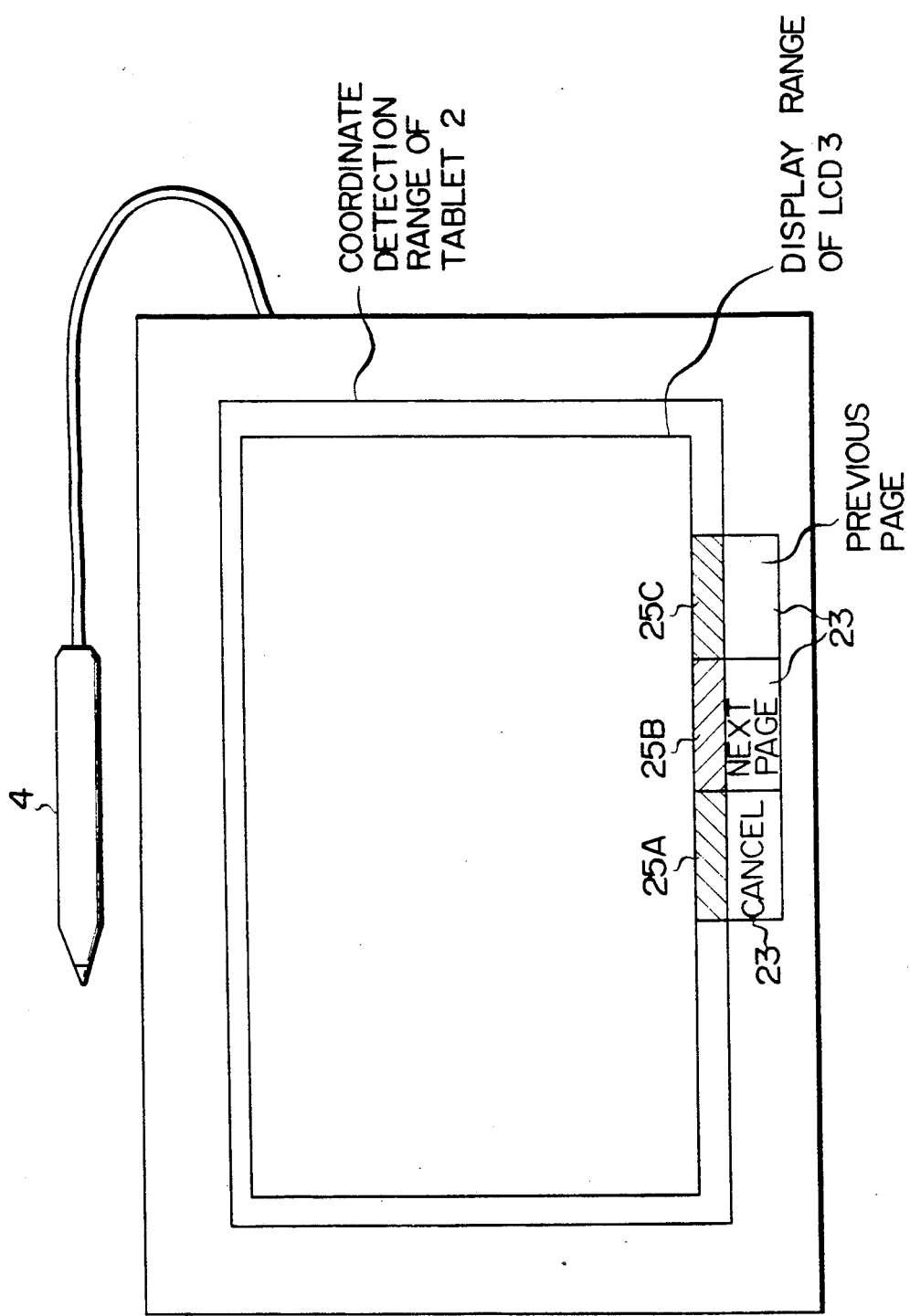
F I G. 5

| AREA | X COORDINATE RANGE | Y COORDINATE RANGE | COMMAND |
|---|---|---|---|
| F1 | X1-X2 | Y1-Y2 | RESET |
| F10 | X3-X4 | Y3-Y4 | CTRL |
| SWITCH ON WITHOUT DETECTION OF COORDINATE | | | ESC |

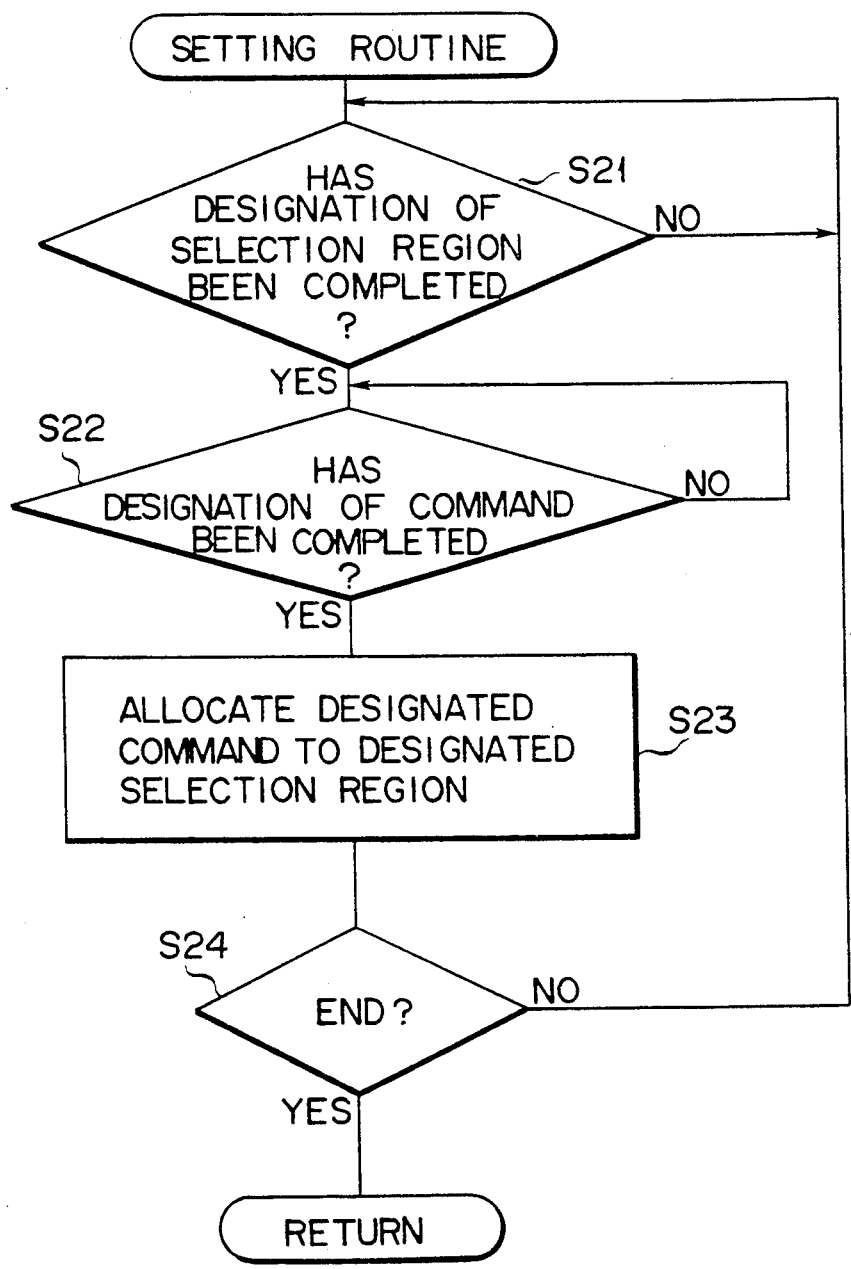
F I G. 14

INFORMATION PROCESSING APPARATUS

BACKGROUND OF THE INVENTION

1. Field of the Invention

The present invention relates to an information processing apparatus for inputting data (including commands, items, etc.) by using an integrated display/input device.

2. Description of the Related Art

Particular attention has been paid to an integrated display/input device as an input device, through which a user inputs data to an information processing apparatus. The integrated display/input device is constituted by superposing a display device and a transparent tablet serving as a coordinate input device. The user inputs data to the information processing apparatus, for example, by pointing a location on the transparent tablet with use of a special pen while seeing the data displayed on the display device through the transparent tablet. In the integrated display/input, the location at which data is input is identical to the location at which data is displayed. Thus, the user can use the apparatus or the computer as if he/she used "pencil and paper".

FIG. 1 shows schematically the structure of an information processing apparatus having a integrated display/input device. In FIG. 1, integrated display/input device 1 is constituted by superposing a transparent tablet 2 on an LCD (liquid-crystal display) 3. A stylus pen 4 is used to point a desired location on the transparent tablet 2. The pen 4 includes a switch for detecting the contact between the surface of the tablet 2 and a tip of the pen 4. The data relating to the location detected by the display/input device 1 is transferred to a controller 5 and subjected to various processing.

In the integrated display/input device 1, the LCD 3 displays menu icons, as shown in FIG. 2. The user or operator points a desired item displayed on the LCD 3 by means of the stylus pen 4, thereby selecting the item or inputting commands. In other words, when the stylus pen 4 is brought into contact with the icon on the transparent tablet 2, the coordinates of the contact point are detected. On the basis of the detected coordinates, the selection of items and input of commands are effected.

As is shown in FIG. 2 and FIG. 3 (cross-sectional view of integrated display/input device 1), the coordinate detection range of the transparent tablet 2 of display/input device 1 is slightly greater than the display range of the LCD 3. Thus, part of the coordinate detection area of the transparent tablet 2 (generally, a peripheral part of tablet 2) extends beyond the display range of the LCD 3. This part, however, is not used for data input.

Some of the icons designed for item selection and command input, for example, the icon representing "cancel" of processing, are always displayed on the LCD 3. Thus, the actually used display range of the LCD 3 is limited to the display range excluding the area for displaying the icons. Under the situation, in the conventional integrated display/input device, the quantity of data input to a single screen and the quantity of data to be displayed is limited, and the total operability of the apparatus is not high.

SUMMARY OF THE INVENTION

An object of the present invention is to provide an information processing apparatus having an integrated display/input device with high operability.

Another object of this invention is to provide an integrated display/input device wherein the quantity of data to be input/displayed on a single screen is increased.

Still another object of the invention is to provide an integrated display/input device wherein a coordinate detection area of a tablet can be used effectively.

In order to achieve the above objects, an integrated display/input apparatus according to a first aspect of the invention is constituted by superposing a display device, such as an LCD, and a coordinate detection device, such as a tablet, for detecting coordinates of a pointed location, such that a part of a coordinate detection area of the coordinate detection device does not overlap a display area of the display device. The information processing apparatus includes this integrated display/input device and execution means for executing predetermined processing (e.g. canceling processing) when coordinates in a predetermined region within the part of the coordinate detection area have been detected by the coordinate detection device.

According to the above structure, data and commands can be input by making use of that part of the coordinate detection area which does not overlap the display area. Thus, the coordinate detection area can be used effectively. In addition, the number of icons, etc. displayed by the display device can be reduced, and the screen of the display device can be use effectively.

An integrated display/input device according to a second aspect of the invention is constituted by superposing a display device, such as an LCD, and a coordinate detection device, such as a tablet, for detecting coordinates of a pointed location. The information processing apparatus having this integrated display/input device includes execution means for executing predetermined processing (e.g. canceling processing) when a location pointing pen such as a stylus pen has pointed a location outside the coordinate detection area of the coordinate detection device.

According to this structure, predetermined processing is carried out in accordance with the state of use of the coordinate input pen (e.g. ON/OFF state of a switch). Thus, a command, etc. can be input easily, and the screen of the display device can be used effectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a plan view of the integrated display/input device shown in FIG. 4;

FIG. 14 is a flowchart for illustrating command allocation processing.

DETAILED DESCRIPTION OF THE PREFERRED EMBODIMENTS

An information processing apparatus according to an embodiment of the present invention will now be described with reference to the accompanying drawings.

At first, the structure of the information processing apparatus according to this embodiment will be described with reference to FIGS. 4 to 8.

Figure 1:
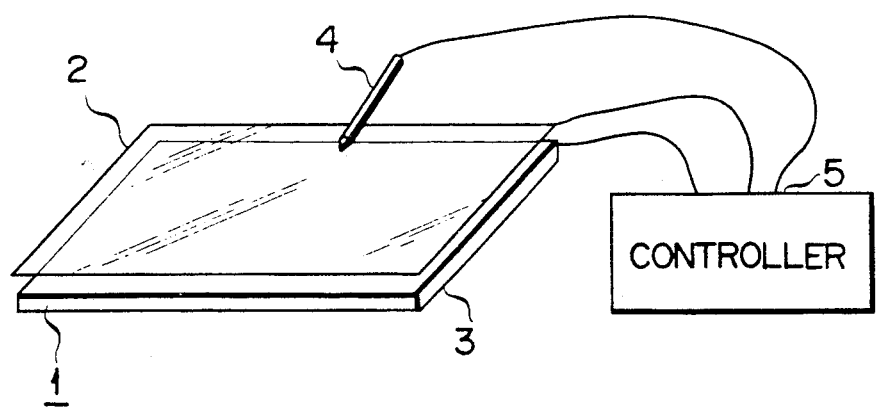
FIG. 1 shows schematically the structure of an information processing apparatus having a conventional integrated display/input device.
Figure 2:
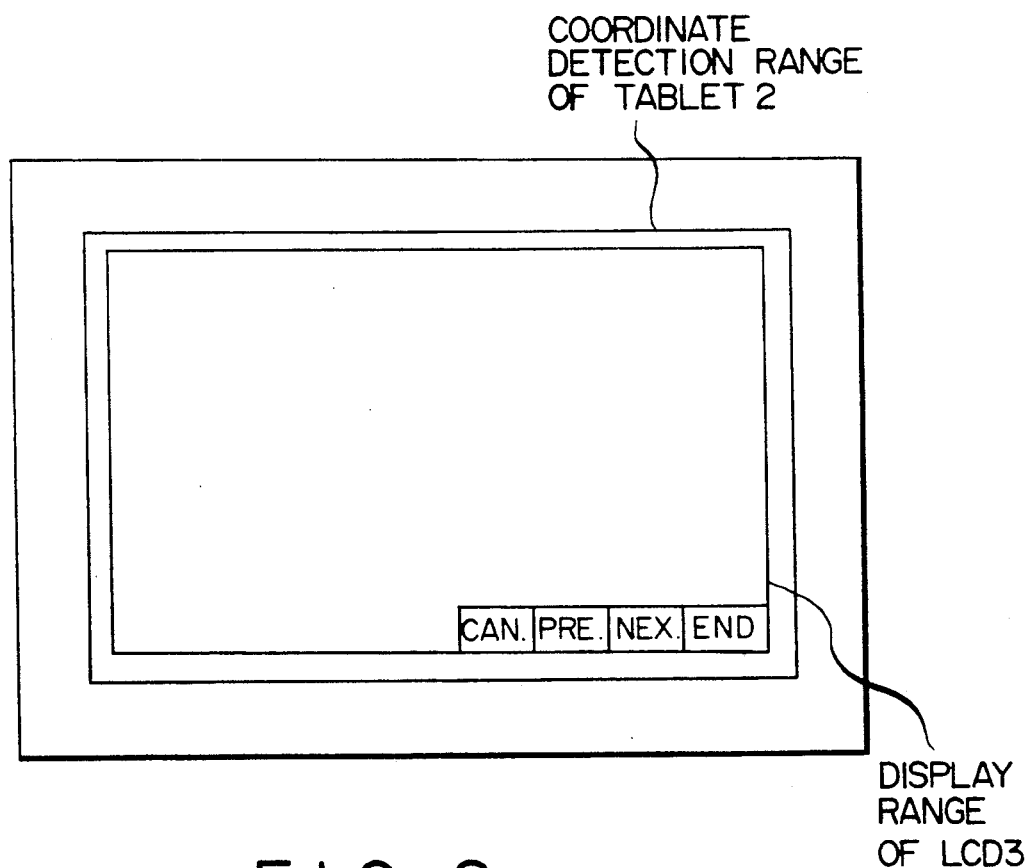
FIG. 2 shows an example of a displayed image on the conventional integrated display/input device.
Figure 3:
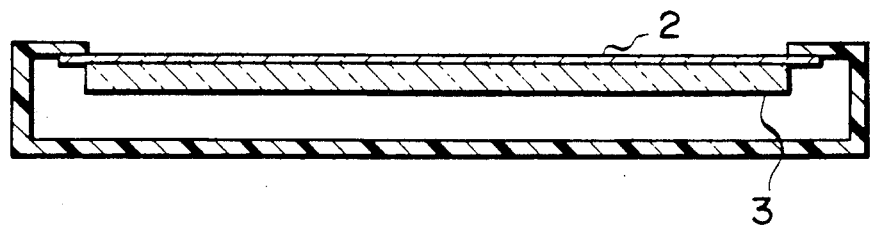
FIG. 3 is a cross-sectional view showing the structure of the integrated display/input device.
Figure 4:
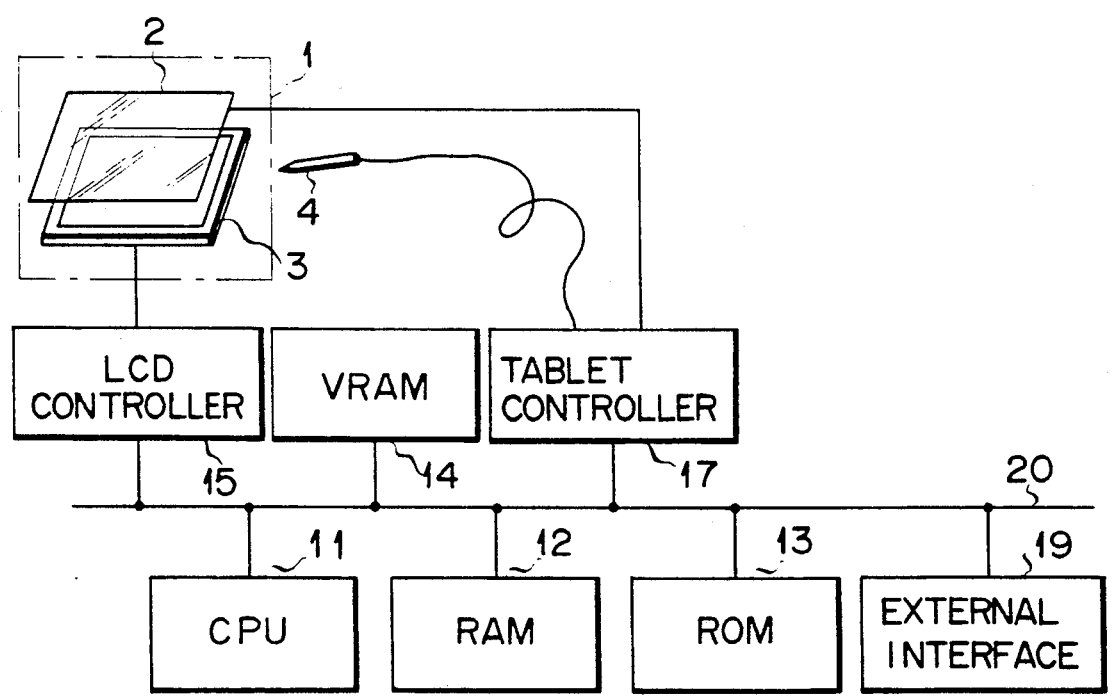
FIG. 4 is a block diagram showing the structure of an integrated display/input device employed in an information processing apparatus according to an embodiment of the present invention.

FIG. 4 is a block diagram showing the structure of the information processing apparatus according to this embodiment. Referring to FIG. 4, an integrated display/input device 1 comprises a transparent tablet 2 and an LCD 3. The transparent tablet 2 is situated on the screen of the LCD 3. FIG. 5 is a plan view of the integrated display/input device 1, and FIG. 3 is a cross-sectional view thereof. A user can see the display image of the LCD 3 through the transparent tablet 2. The transparent tablet 2 comprises a glass plate and transparent electrodes (X-electrodes and Y-electrodes extending along X- and Y-axes intersecting at right angles to each other, the electrodes being provided in the glass plate.

A stylus pen 4 is used to point a desired location on the transparent tablet 2. The stylus pen 4 contains a switch at its tip portion. The switch is turned on when its tip portion is pressed, and the switch is turned off when its tip portion is not pressed. A pulse voltage is successively applied to the electrodes within the transparent tablet 2, and the XY coordinates of the location pointed by the stylus pen 4 are detected by electrostatic induction. The transparent tablet 2 and stylus pen 4 are controlled by a tablet controller 17 (described later). The LCD 3 is controlled by an LCD controller 15.

The LCD 3 is enabled to display a desired image and a given point on the transparent tablet 2 is pointed by the stylus pen 4, whereby both data display and data input are carried out at one coordinate area.

In FIG. 4, a CPU 11 controls the entire information processing apparatus. A RAM 12 is capable of performing data read/write and stores programs and various data for determining the operation of the CPU 11. Specifically, the RAM 12 stores programs, data relating to the locations (display range) of icons to be displayed on the LCD 12, and other data. The details of the RAM 12 will be described later. On the basis of the data stored in the RAM 12, it is determined which item or icon corresponds to the location pointed by the stylus pen 4.

A ROM 13 is a read-only memory for storing a diagnosing program to be run after the information processing apparatus has been switched on, a boot program for starting the information processing apparatus, etc. A VRAM 14 is a bit map memory for storing display data. The LCD controller 15 controls display data transfer from the VRAM 14 to the LCD 3, display data transfer from the CPU 11 to the VRAM 14, etc. A tablet controller 17 controls the scan of X- and Y-electrodes of the transparent tablet 2, the voltage detection (in the case of electrostatic coupling system) of the location pointed by the stylus pen 4, generation of XY coordinate data, and transmission of XY coordinate data to the CPU 11. An external interface 19 controls transmission of data between the main apparatus and an external apparatus on an as-needed basis. These components are mutualy connected by a bus 20.

FIG. 5 is a plan view of the integrated display/input device 1 according to this embodiment. As is shown in FIG. 5, the coordinate detection range (the range within which coordinates can be detected) of the transparent tablet 2 is greater than the display range (the range within which data can be displayed) of the LCD 3. Selection regions 25A, 25B and 25C are provided on that part of the coordinate detection range which extends beyond the display range of LCD 3. In FIG. 5, the selection region 25A is used for inputting a command "cancel", the selection region 25B for inputting a command "next page", and the selection region 25C for inputting a command "previous page". The upper surface of the casing of transparent tablet 2 bears labels indicating the commands assigned to the regions 25A, 25B and 25C. The cross section of the integrated display/input device 1 is the same as is shown in FIG. 3.

Figure 6:
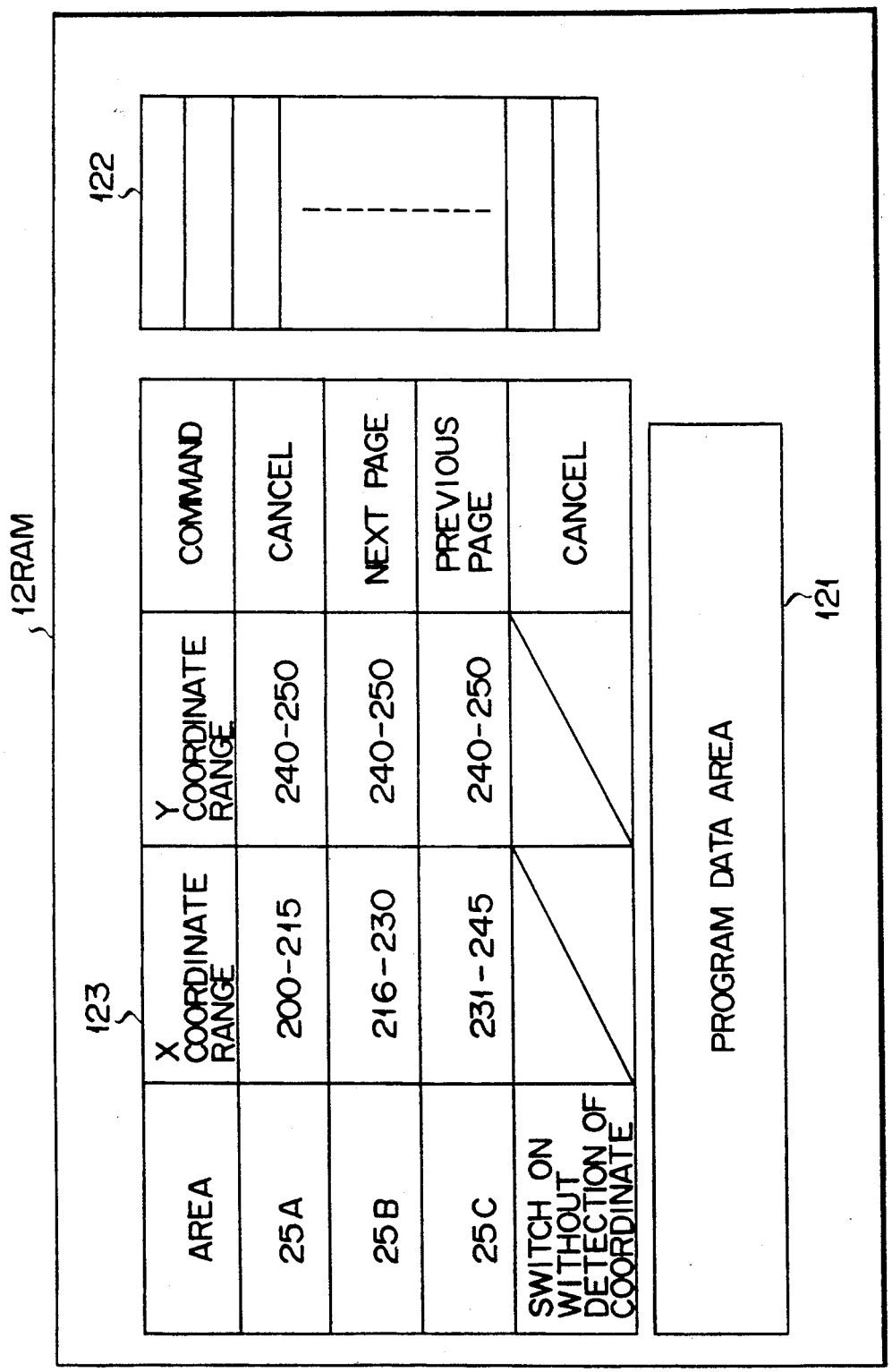
FIG. 6 shows the structure of RAM 12 shown in FIG. 4.

Referring to FIG. 6, the data structure in RAM 12 will now be described.

The RAM 12 comprises a program/data area 121 for storing application programs and data, a queue area 122, and a command indication area 123. The program/data area 121 stores application programs and data under processing. The queue area 122 constitutes a first-in-first-out queue, for example. The command indication area 123 stores X-coordinate and Y-coordinate ranges of the selection regions 25A, 25B and 25C and commands assigned thereto. In addition, the command indication area 123 stores data relating to processing to be carried out when no coordinates are detected and the turning-on of the switch in the stylus pen 4 is detected (i.e. when the stylus pen 4 is clicked on an area outside the location detection range of the tablet 2). For example, in FIG. 6, the X-coordinate range of the region 25A is 200-215, the Y-coordinate range thereof is 240-250, and the corresponding command is "cancel".

Figure 7:
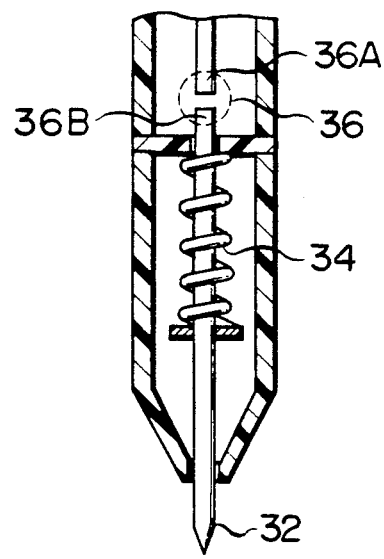
FIG. 7 shows the structure of a switch portion of the stylus pen.
Figure 8:
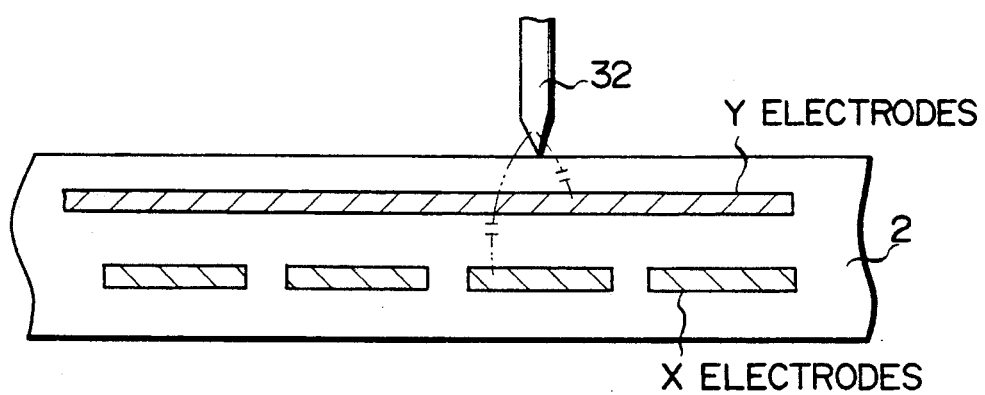
FIG. 8 is a view for explaining the structure of the transparent tablet and the location detecting operation.

Referring now to FIGS. 7 and 8, the stylus pen 4 and tablet 2 are described.

As is shown in FIG. 7, electrodes 36A and 36B are normally kept in a non-contact state (the OFF state of switch 36) by means of a spring 34. When characters are written or locations are pointed by means of the stylus pen 4, a pen tip 32 is pushed against the force of spring 34 and consequently the electrodes 36A and 36B are brought into contact (the ON state of switch 36). Irrespective of whether the stylus pen 4 is situated within the coordinate detection range of the transparent tablet 2, the contact/non-contact data of electrodes 36A and 36B (ON/OFF state of switch 36) is transmitted to the CPU 11 through the tablet controller 17.

When the stylus pen 4 is situated on the transparent tablet 2, the coordinates of the location of the tip 32 of stylus pen 4 are detected by electrostatic induction occurring between the tip 32 of stylus pen 4 and the tablet 2. The process of the detection is illustrated in FIG. 8. The coordinates are transmitted to the CPU 11 through the tablet controller 17.

The CPU 11 detects input data, on the basis of the coordinates detected by the transparent tablet 2 and the switching data obtained from the stylus pen 4. In other words, the CPU 11 determines, as input data, the coordinates obtained when the switching data has been changed from "OFF" state to "ON" state.

The operation of the information processing apparatus having the display/input device of the structure shown in FIGS. 4 to 8 will now be described.

Figure 9:
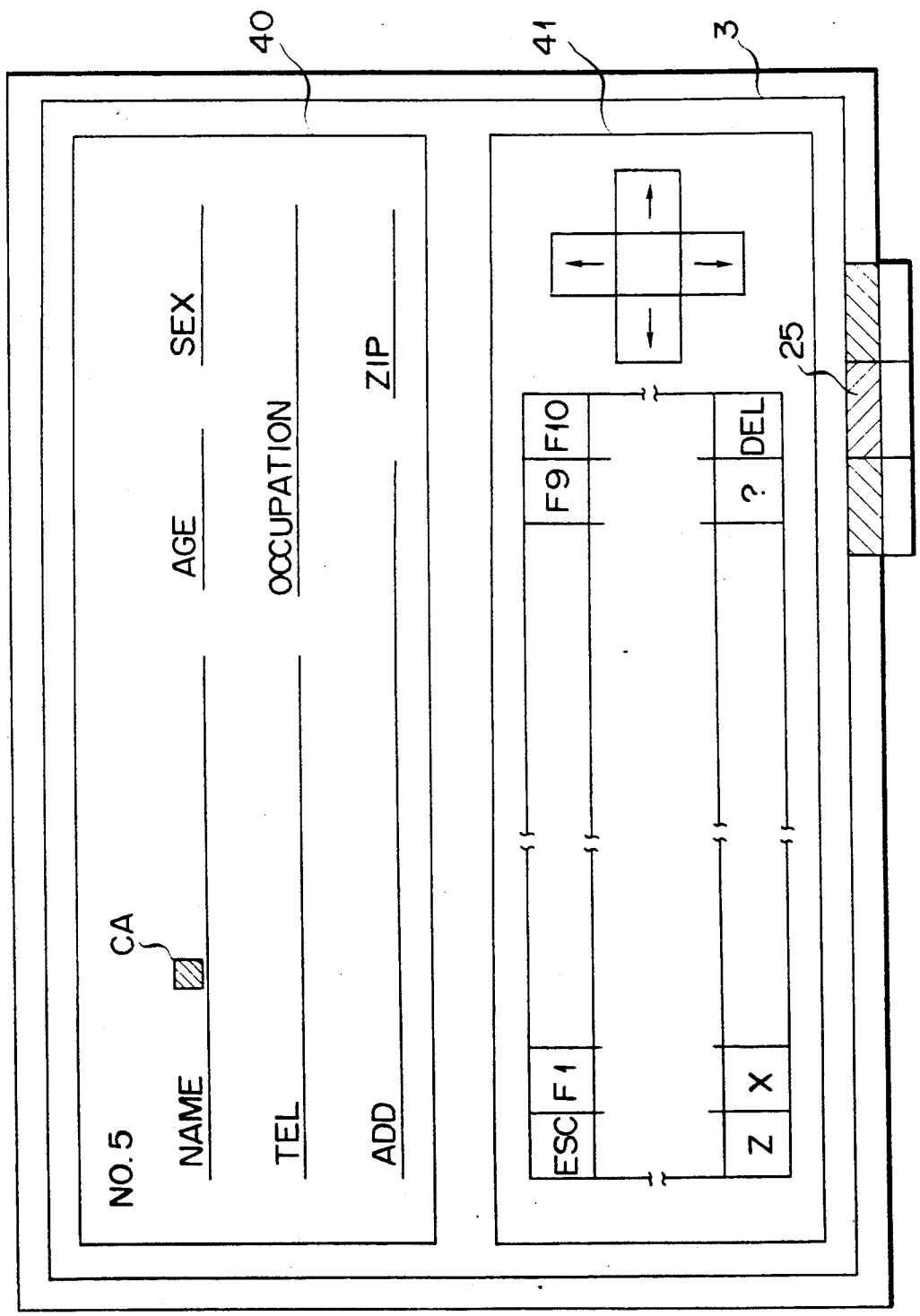
FIG. 9 is a view for explaining an example of a display image on LCD 3.

Application software is activated in the information processing apparatus. In accordance with the software, a data input screen is displayed on the LCD 3. For example, consideration is given to a data input screen for an address list 40, as shown in FIG. 9. In the address list input screen 40, input fields are allocated to "name", "age", "sex", "telephone number", "occupation", "address", and "zip code". A cursor CA for pointing a data input location is displayed.

A pop-up keyboard 41 for inputting data to the screen 40 is displayed on the LCD 3, as shown in FIG. 9. The user points (clicks) a desired one of displayed data keys or command keys by means of the stylus pen 4, thereby inputting data. Further, the user points the selection region 25A, 25B or 25C by the stylus pen 4, thereby inputting the command "cancel", "next page" or "previous page".

On the basis of the coordinates of the location of the tip 32 of pen 4 and the switching data, the CPU 11 detects input data. Specifically, the coordinates obtained when the switching data has been changed from "OFF" state to "ON" state are determined as input data.

When the coordinates of the location of the tip 32 of pen 4, which are obtained when the switching data has been changed from "OFF" state to "ON" state, are within the display range of the LCD 3, the CPU 11 starts processing of the selected item or input command pointed by the pen 4.

On the other hand, when the coordinates of the location of the tip 32 of pen 4, which are obtained when the switching data has been changed from "OFF" state to "ON" state, are within the selection regions 25A to 25C, the CPU 11 determines which of the regions "cancel", "next page" and "previous page" is selected, on the basis of the data set in the command indication area 123 in the RAM 12. The CPU 11 executes the processing corresponding to the result of determination.

If no coordinates are detected when the switching data has been changed from "OFF" state to "ON" state, the CPU 11 executes the "cancel" processing on the basis of the data set in the command indication area 123 in the RAM 12. More specifically, if the tip 32 of stylus pen 4 points that area on the transparent tablet 2, which is outside the coordinate detection range, the CPU 11 executes the "cancel" processing.

In the data input wait state, the CPU 11 always receives the coordinates pointed by the stylus pen 4 and the switching data. Thus, in accordance with the specific state in which the coordinates are not detected and the switch is turned on, the specific processing such as "cancel" can be performed. As a result, the quantity of data to be input or displayed on one screen can be increased.

Though the pop-up keyboard is employed in this embodiment, data may be input by using, for example, on-line hand-written character recognition technique.

The above-described operation will now be described in greater detail by referring to the flowcharts of FIGS. 10 and 11.

Figure 10:
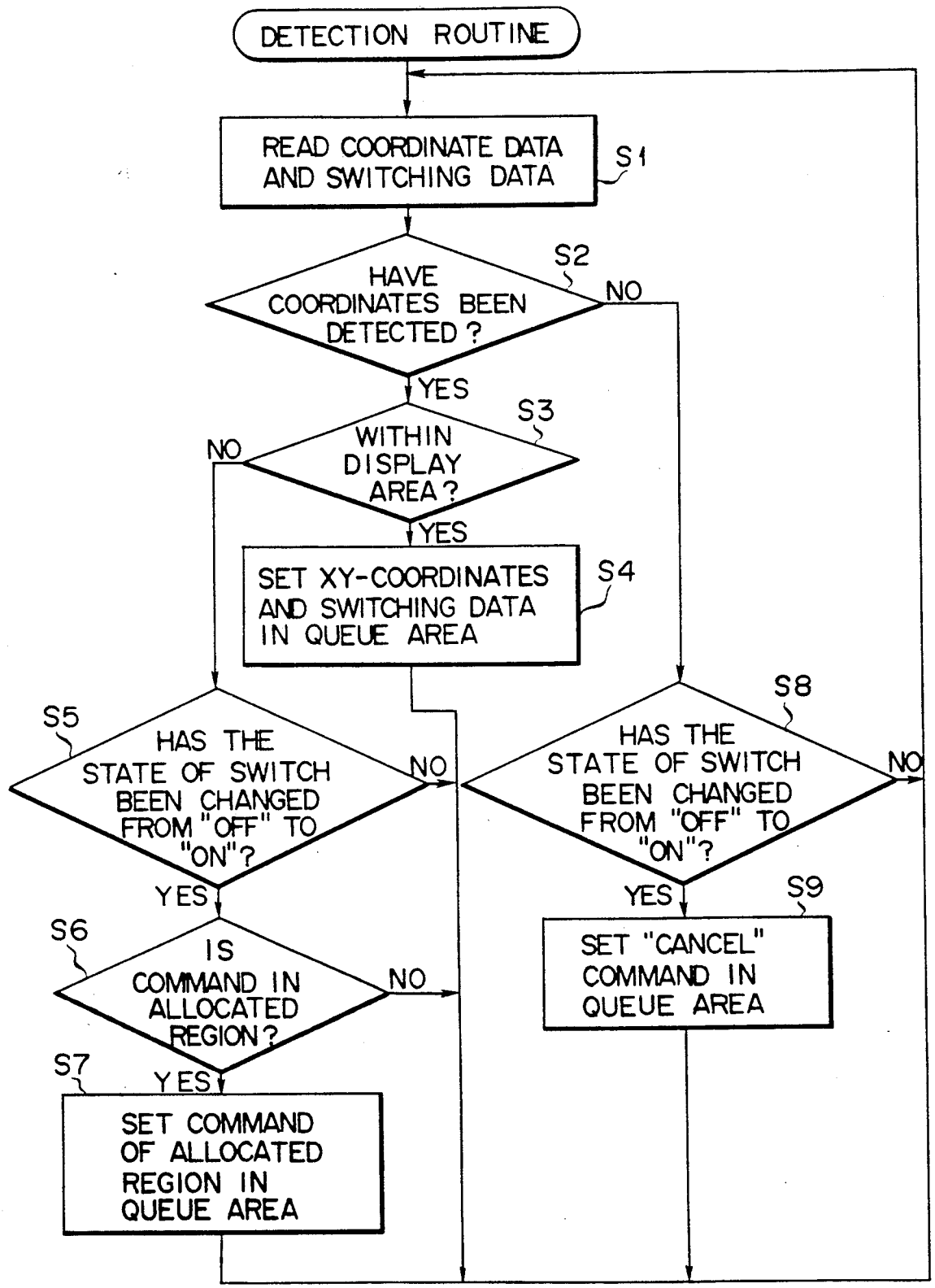
FIGS. 10 and 11 are flowcharts for illustrating the operation of the information processing apparatus show in FIGS. 4 and 5.
Figure 11:
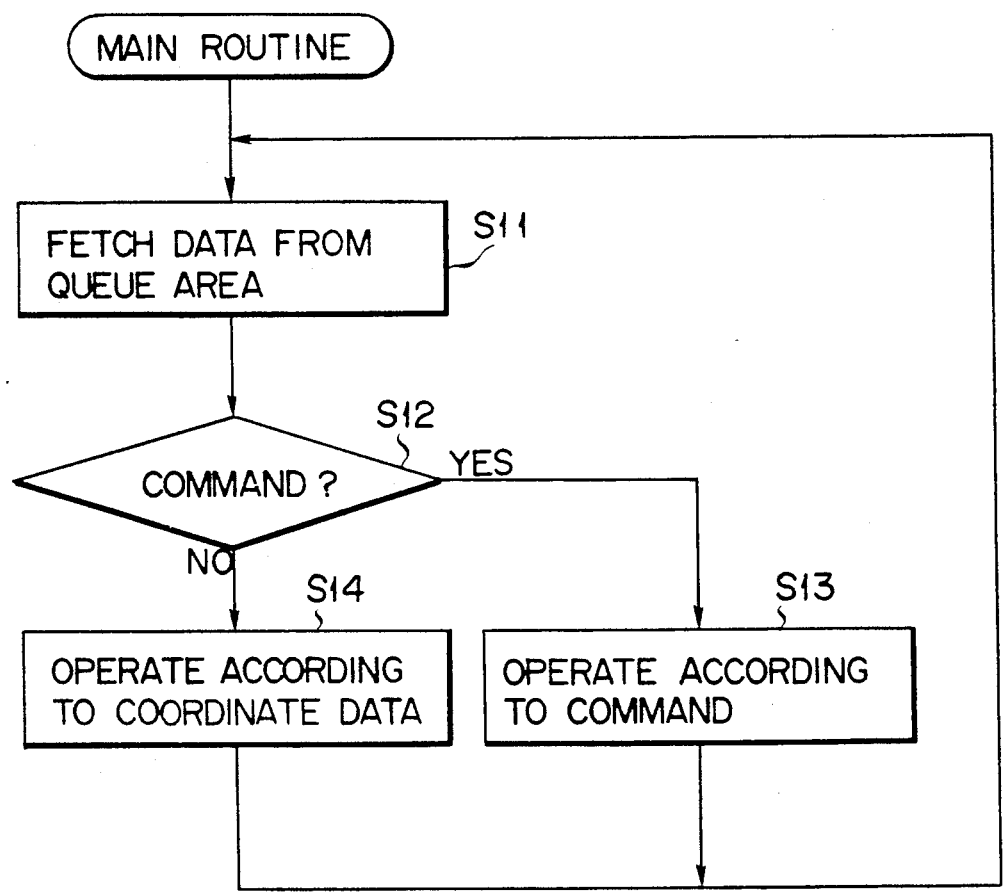

In the example of FIGS. 10 and 11, the CPU 11 carries out a detection routine (FIG. 10) periodically, for example, by timer interruption, while carrying out a main routine (FIG. 11).

Suppose that character "Z" is to be input to the location indicated by the cursor CA on the data input display screen 40 of FIG. 9. In this case, the user points the key (icon) "Z" on the pop-up keyboard 42 by means of the stylus pen 4. Accordingly, in step S1, the change of state of switch 36 from "OFF" to "ON" and the coordinates corresponding to key "Z" are read. IN step S2, it is checked whether the coordinates have been detected. Since the key "Z" is situated within the coordinate detection range of the transparent tablet 2, the coordinates are detected. Accordingly, the control routine goes to step S3. In step S3, it is checked whether the detected coordinates are within the display range. The key "Z" is present within the display range, and accordingly the control advances to step S4. In step S4, the switching data representing the fact that the state of switch 36 has been changed from "OFF" to "ON" and the detected coordinates are set at the last portion in the queue area 122 of the RAM 12.

On the other hand, when input data or command is to be canceled, the user points the selection region 25A by means of the stylus pen 4. The control routine advances from step S3 to step S5. In step S5, it is checked whether the state of switch 36 has been changed from "OFF" to "ON". In step S6, the command indication region 123 in the RAM 12 is referred to, and it is detected that the command "cancel" is present in the allocated region. Subsequently, in step S7, the command "cancel" is set in the last portion in the queue area 122 of the RAM 12.

When the pointed location is outside the display range and outside the selection regions, the control flow returns from step S6 to step S1, and no specific processing is carried out.

Suppose that the user puts the tip 32 of pen 4 on the region outside the tablet 2. In this case, the control flow goes from step S2 to step S8. In step S8, it is checked whether the state of switch 36 has been changed from "OFF" to "ON". If the state of switch 36 has been changed to "ON", the "cancel" command is set at the last portion of the queue area 122 of the RAM 12 (step S9).

If the maintaining of "ON" state of switch 36 is determined in steps S5 and S8, the flow returns to step S1.

On the other hand, in the main routine, data is fetched from the queue 122 (step S11), and it is checked whether the fetched data is a command or not (step S12). If the fetched data is not a command, that is, if the fetched data is the coordinate data and switching data set in step S4, the CPU 11 carries out the corresponding operation (step S13). Referring back to the above example, the CPU 11 inputs character "Z" at the location pointed by the cursor CA. If the fetched data is a command, the operation corresponding to the command is carried out in steps S7 or step S9 (step S14). In this way, the data indicated by the user by means of the stylus pen 4 is detected and fed to the main flow via the queue 122, whereby the desired operation is carried out.

As has been described above, using that part of the coordinate detection range which extends beyond the display range, the item selection and command input can be performed. Thus, even if there is an item which should be capable of being always selected, the entire display area can be used to display given contents. Similarly, by making it possible to select items or input commands on the basis of only the switching data, the entire display area can be used to display given contents.

Since data can be input from the selection regions 25, the effective coordinate detection area is advantageously used. In the above embodiment, the selection regions 25 are provided only at a portion of that part of the coordinate detection range which extends beyond the display range; however, the regions 25 may be provided at desired locations. In this case, the data representing the locations of the regions 25 is stored in the RAM 12.

In the above embodiment, the "cancel" command is allocated such that it is carried out either in the case where the selection region 25A is selected, or where no coordinates are detected and the switching-on is detected. It is, of course, possible to allocate different commands to these cases.

Figures 12, 13:
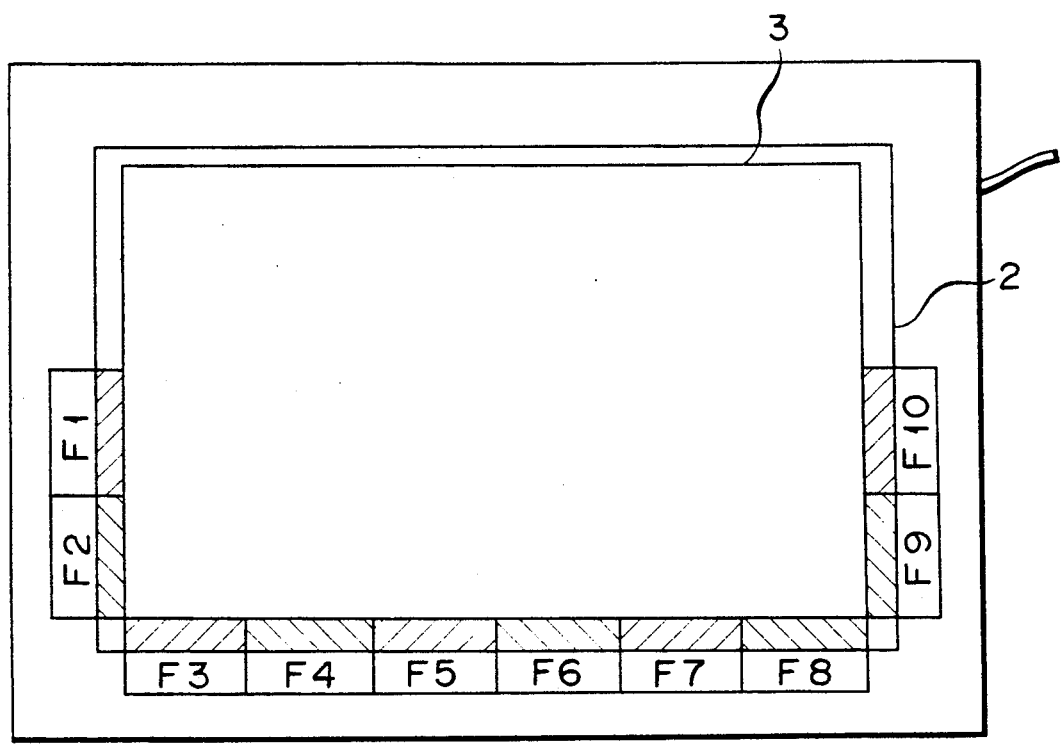
FIG. 12 is a plan view showing another embodiment of the integrated display/input device
FIG. 13 shows another example of command setting area 123 of RAM 12.

The number of selection regions 25 is not limited to three. Desired commands can be allocated to the selection regions by rewriting the command names (codes) set in the command indication area 123 of the RAM 12. For example, function keys [F1] to [F10] used in a conventional computer keyboard may be arranged, as shown in FIG. 12, and desired commands and processing functions may be allocated to the function keys, as shown in FIG. 13.

The operation of allocating commands to the command indication area 123 will now be described with reference to the flowchart of FIG. 14. At first, an allocation routine illustrated in FIG. 14 is called. In this routine, selection region numbers and command types are displayed on the LCD 3. In this state, the user designates one of the selection regions (step S21) and then designates a command (step S22). In accordance with the designated region and command, the CPU 11 rewrites the command name (code) in the are for the designated region in the RAM 12.

In the above embodiment, an LCD is used as a display device; however, it may be replaced by a CRT, a plasma display, etc. The tablet 2 is not limited to the transparent type. The structure of the tablet 2 is not limited to that employed in the embodiment. For example, the tablet may have various conventional structures. The structure for detecting the location of the stylus pen is not limited to that employed in the embodiment. For example, in the embodiment, the integrated display/input apparatus, which is constituted by superposing an electrostatic coupling type transparent tablet on the top surface of an LCD, was employed; however, the employed integrated display may be constituted by mounting an electromagnetic coupling type opaque tablet on the bottom surface of the LCD.

In the above embodiment, the CPU 11 controls the entire apparatus; however, the tablet controller 17 itself, for example, may have its own CPU. In this case, the command indication area 123 in the RAM 12 may be situated within the tablet controller 17. The structure of the stylus pen is not limited to that employed in the above embodiment.

As has been described above, according to the present invention, the item selection and command input can be carried out by using that part of the coordinate detection range of the tablet, which extends beyond the display range of the display device of the integrated display/input device, and only on the basis of the switching data. Thus, the quantity of data to be input and displayed on a single screen can be increased, and the total operability of the apparatus is enhanced.

In particular, the advantage of the invention can be enhanced by setting items and commands which are used commonly in a plurality of application programs. In addition, the set commands can be changed on an as needed basis.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information processing apparatus capable of performing a plurality of processes and having a display/input device, said display/input device comprising a display device having a screen for displaying an image, a transparent tablet device superposed on the display device for detecting coordinates of a pointed location, and a stylus pen for pointing out a location on the tablet device, wherein an operator points out, using the stylus pen, an icon corresponding to input data and included in a display image on the display device thereby inputting the input data, wherein a first part of a coordinate detection area of the transparent tablet device overlaps the screen of the display device, and a second part of the coordinate detection area of the transparent tablet device extends beyond a periphery of the screen of the display device, and said information processing apparatus further includes execution means, responsive to the transparent tablet device, for executing a first predetermined process corresponding to the input data when a predetermined region in said second part of the coordinate detection area of the transparent tablet is pointed out by using the stylus pen, and for executing a second predetermined process corresponding to the input data when a locating outside the coordinate detection area of the transparent tablet device is pointed out by using the stylus pen.

2. An information processing apparatus capable of performing a plurality of processes and having a display/input device, said display/input device comprising a display device having a screen for displaying an image, and a coordinate detection device superposed on the screen of the display device and having an area over which coordinates can be detected, wherein a center part of said area of the coordinate detection device overlaps the screen of the display device and a periphery part of said area of the coordinate detection device extends beyond an outer periphery of the screen, said information processing apparatus comprising:

execution means for executing a predetermined one of the processes in response to the detection of coordinates on predetermined regions within said periphery part of said area, and wherein said execution means includes input means for inputting data indicating one of the predetermined regions and process allocation means for allocating one of the processes to one of the predetermined regions in response to data input by the input means, thereby allowing a user to allocate arbitrary processes to the respective predetermined regions.

3. The information processing apparatus according to claim 2, wherein said execution means includes comparison means for comparing the coordinates detected by the coordinate detection device with the coordinates of the predetermined regions, and said execution means executes said predetermined one of the processes for each predetermined region in response to the comparison result of the comparison means.

4. The information processing apparatus according to claim 2, wherein different processes are allocated to the respective predetermined regions.

5. The information processing apparatus according to claim 2, wherein said periphery part of the area of the coordinate detection device is situated at a peripheral part of the area over which coordinates can be detected.

6. An information processing apparatus capable of performing a plurality of processes and having a display/input device, said display/input device comprising display means for displaying an image, coordinate detection means for detecting coordinates of a pointed location, and location pointing means for pointing out the pointing location, said information processing apparatus comprising:

execution means, responsive to the location pointing means and the coordinate detection means, for recognizing a pointing action by the location pointing means when the location pointing means has pointed out a location outside a coordinate detection area of the coordinate detection means, thereby executing a predetermined one of the processes.

7. The information processing apparatus according to claim 6, wherein said execution means, responsive to the location pointing means and the coordinate detection means, executes the predetermined ones of the processes when the location pointing means has pointed out a location, the coordinates of which are not capable of being detected by the coordinate detection means.

8. The information processing apparatus according to claim 6, wherein said execution means includes changing means for changing the predetermined one of the processes.

9. An information processing apparatus capable of performing a plurality of processes, comprising:

a display device having a screen for displaying an image including an icon for instruction input;

location pointing means for pointing out a location, said location pointing means including indication means for indicating that a location has been pointed out and coordinate detection means for detecting coordinates of the pointed location;

comparison means for comparing the location pointed out by the location pointing means with the location of the icon displayed on the screen and for generating a comparison result, said comparison means including determining means for determining whether the location pointed out by the location pointing means is within a prescribed region outside said screen and for generating a determination result;

first execution means, responsive to the comparison result of the comparison means, for executing a one of the processes corresponding to the icon when the location pointed out by the location pointing means coincides with the location of the icon displayed on the screen; and second execution means, responsive to the comparison result of the comparison means, for executing a one of the processes corresponding to a predetermined command when the location pointed out by the location pointing means does not coincide with the location of the icon displayed on the screen and for executing, using the determination result, the one of the processes corresponding to a predetermined command when the location pointed out by location pointing means is within said predetermined region and for executing another one of the processes corresponding to a predetermined command when the indication means has indicated that the location has been pointed out and the coordinate detection means has detected no coordinates.

10. The information processing apparatus according to claim 9 further including allocation means for allocating the predetermined command for the respective predetermined region.

11. The information processing apparatus according to claim 1, wherein said stylus pen includes switch means for turning on when a point of the stylus pen is pressed, and said execution means executes the second predetermined process when said switch means is turned on without said transparent tablet device detecting the coordinates.

* * * * *

UNITED STATES PATENT AND TRADEMARK OFFICE
CERTIFICATE OF CORRECTION

PATENT NO. : 5,177,328
DATED : January 05, 1993
INVENTOR(S) : Takafumi Ito et al.

It is certified that error appears in the above-indentified patent and that said Letters Patent is hereby corrected as shown below:

Claim 1, column 8, line 54, change "locating" to --location--.

Claim 6, column 9, line 34, change "pointing" to --pointed--.

Claim 7, column 9, line 48, change "ones" to --one--.

Signed and Sealed this

Eleventh Day of January, 1994

Attest:

BRUCE LEHMAN

*Attesting Officer*  *Commissioner of Patents and Trademarks*